(12) United States Patent
Ziegler et al.

(10) Patent No.: US 11,330,040 B2
(45) Date of Patent: May 10, 2022

(54) TRANSMITTING MESSAGES IN AN INTERNET TRANSMISSION SYSTEM

(71) Applicant: INSTITUT FUR RUNDFUNKTECHNIK GMBH, Munich (DE)

(72) Inventors: Christoph Ziegler, Munich (DE); Klaus Merkel, Munich (DE); Michael Probst, Munich (DE)

(73) Assignee: Institut Fur Rundfunktechnik GMBH, Munich (DE)

( * ) Notice: Subject to any disclaimer, the term of this patent is extended or adjusted under 35 U.S.C. 154(b) by 914 days.

(21) Appl. No.: 15/515,472

(22) PCT Filed: Sep. 30, 2015

(86) PCT No.: PCT/EP2015/072577
§ 371 (c)(1),
(2) Date: Mar. 29, 2017

(87) PCT Pub. No.: WO2016/050853
PCT Pub. Date: Apr. 7, 2016

(65) Prior Publication Data
US 2018/0234483 A1 Aug. 16, 2018

(30) Foreign Application Priority Data

Oct. 1, 2014 (IT) .......................... MI2014A001716

(51) Int. Cl.
*G06F 15/16* (2006.01)
*H04L 67/06* (2022.01)
(Continued)

(52) U.S. Cl.
CPC .............. *H04L 67/06* (2013.01); *G06F 16/95* (2019.01); *H04L 67/02* (2013.01);
(Continued)

(58) Field of Classification Search
CPC ......... H04L 67/06; H04L 67/42; H04L 67/02; H04L 67/2838; H04L 69/329; G06F 16/95; Y02D 10/45
See application file for complete search history.

(56) References Cited

U.S. PATENT DOCUMENTS

| 5,339,171 | A | * | 8/1994 | Fujisawa | .............. H04N 1/4056 358/3.03 |
| 2002/0035597 | A1 | * | 3/2002 | Khodko | .................. H04L 29/06 709/203 |

(Continued)

OTHER PUBLICATIONS

Monsur Hossain, *Using CORS*, XP002742941, http://www.html5rocks.com/en/tutorials/cors/ Oct. 26, 2011, pp. 18.
(Continued)

*Primary Examiner* — Anh Nguyen
(74) *Attorney, Agent, or Firm* — Workman Nydegger

(57) ABSTRACT

A method for transmitting messages from a server to a client in an internet transmission system includes: (a) the client sends to the server a request for transmitting a picture file, (b) in response to the reception of the request the server generates a picture file with a first content, in case that no message is available for the client, and delays the transmission of the picture file to the client for a time interval, (c) in response to the reception of the picture file with the first content, the client again sends a request for sending (transmitting) a picture file, (d) the steps (a) to (c) are repeated till, upon the last request, a message is available at the server for transmission to the client, (e) the server transmits, in response to the last request of the client, the picture file with a second content, (f) in response to the reception of the picture file with the second content, the client then sends a request for transmitting the message, (g) in response to the reception of the request for transmitting the message, the server then transmits the message to the client.

35 Claims, 5 Drawing Sheets

(51) Int. Cl.
*G06F 16/95* (2019.01)
*H04L 67/567* (2022.01)
*H04L 67/02* (2022.01)
*H04L 67/01* (2022.01)
*H04L 69/329* (2022.01)

(52) U.S. Cl.
CPC .......... *H04L 67/2838* (2013.01); *H04L 67/42* (2013.01); *H04L 69/329* (2013.01); *Y02D 10/00* (2018.01)

(56) References Cited

U.S. PATENT DOCUMENTS

| | | | | |
|---|---|---|---|---|
| 2008/0229304 | A1* | 9/2008 | Bengtsson | G06F 8/61 717/178 |
| 2009/0254589 | A1* | 10/2009 | Nair | G06F 16/275 |
| 2012/0023156 | A1* | 1/2012 | Ueda | H04L 67/02 709/203 |
| 2012/0303697 | A1* | 11/2012 | Alstad | G06F 16/9574 709/203 |
| 2014/0075287 | A1 | 3/2014 | Scoda | |

OTHER PUBLICATIONS

International Search Report dated Dec. 4, 2015, issued in PCT Application No. PCT/EP2015/072577, filed Sep. 30, 2015.
International Preliminary Report on Patentability dated Apr. 4, 2017, issued in PCT Application No. PCT/EP2015/072577, filed Sep. 30, 2015.
Anonymous: "Push technology—Wikipedia, the free encyclopedia", Dec. 29, 2011, XP055261985, Retrieved from the Internet: URL:https://en.wikipedia.ora/w/index.php?title=Push_technology&oldid=468308083, pp. 5.
Australian Office Action dated Jun. 1, 2020, issued in Australian Application No. 2015326855.

* cited by examiner

TRANSMITTING MESSAGES IN AN INTERNET TRANSMISSION SYSTEM

DESCRIPTION BACKGROUND OF THE INVENTION

1. Field of the Invention

The invention relates to methods, servers, and clients in an internet transmission system.

2. Present State of the Art

It is known to use long polling methods for communication and transmission of data. Here, the client sends a request for transmission of a file or information to a server, so that the server, if the requested file or information exists, transmits the same to the client. The mentioned long polling method, however, has restrictions and disadvantages. According to the first claim, the present invention provides a method for transmitting messages from the server to the client in an internet transmission system, the method being characterized by the following steps:

a. the client sends to the server a request for transmitting a picture file,
b. in response to the reception of the request the server generates a picture file with a first content, in case that no message is available for the client, and delays the transmission of the picture file to the client for a time interval,
c. in response to the reception of the picture file with the first content, the client again sends a request for sending (transmitting) a picture file,
d. the steps (a) to (c) are repeated till, upon the last request, a message is available at the server for transmission to the client,
e. the server transmits, in response to the last request of the client, the picture file with a second content,
f. in response to the reception of the picture file with the second content, the client sends a request for transmitting the message,
g. in response to the reception of the request for transmitting the message, the server then transmits the message to the client.

Preferably, the server transmits the picture file with the second content immediately after the message is available at the server for transmission to the client.

SUMMARY OF THE INVENTION

The method according to the invention has the advantage that an interpreter, in particular a Javascript interpreter, is not blocked by the request for a picture file. Furthermore, the loading of a picture does not block loading of another picture. In addition, the method according to the invention has the advantage that the loading of scripts is not stopped.

A further advantage of the method according to invention is that delaying the transmission of the picture file by the time interval reduces the communication load for the server and client, at the same time reducing energy consumption and increasing profitability of the total system.

An additional advantage of the method according to the invention is circumventing restrictions by the security concept according to SOP (Same Origin Policy) which prevents access to files with a different source address or domain address.

A further advantage of the method according to the invention is improving the response time by the server to inform the client about existence or nonexistence of a message, since the request is already present at the server and the client is preferably immediately informed upon a change of status.

The picture file is preferably a GIF, JPEG or another known picture file format.

According to a further aspect of the invention the two picture files differ in some property of the picture files, preferably the image sizes are different. Here, the picture file with the first content is a picture file with only one pixel and the picture file with the second content is a picture file with two pixels, wherein this assignment can vary and is not to be understood restrictively, so that other numbers of pixels can also be used.

According to a further aspect of the invention JSONP (JSON with Padding) is used for transmitting the message.

Preferably the requests are carried out as HTTP requests.

Further preferably the requests of the client are carried out in a communication application.

Preferably the client receives in a further application a link from a further server and the communication application is loaded from the first mentioned server to the client via this link.

According to the invention both applications are carried out in a browser environment in the client.

Further preferably the further application is loaded from the further server by the client. Both servers preferably work on different domains.

According to a further aspect of the invention the requests and the transmission of the picture files are realized by means of repeated long polling on the picture files, and the transmission of the message is carried out by means of a short polling method via JSONP.

The invention also provides a client for carrying out one of the methods according to the present invention.

The invention further provides a server for carrying out one of the methods according to the present invention.

According to the invention a client is provided for receiving messages in an internet transmission system, wherein the client is adapted to send a request to a server for transmitting a picture file, to receive a picture file from the server and to establish the content of the picture file, wherein, if the picture file has a first content, the client is further adapted to repeatedly send a request to the server for transmitting a picture file, wherein, if the picture file has a second content, the client is further adapted to send a request to the server for transmitting the message and to receive the message.

The picture file is preferably a GIF, JPEG or another known picture file format.

According to a further aspect of the invention the client is provided with a detection unit for establishing whether the picture file with the first content is a picture file comprising one pixel.

According to a further aspect of the invention the client is provided with a detection unit for establishing whether the picture file with the second content is a picture file comprising two pixels.

Preferably the client uses JSONP for transmitting the message. Further preferably, the client carries out the requests as HTTP requests.

Preferably the client is adapted to carry out the requests in a communication application. Further preferably the client is adapted to receive a link in a further application from a further server and to load the communication application from the first mentioned server via this link.

Further preferably the client is adapted to carry out both applications in a browser environment.

Further preferably the client is adapted to receive the further application from the further server.

According to another advantageous aspect of the present invention the client is characterized in that requests and the transmission of the picture files are realized by means of repeated long polling on the picture files and the transmission of the message is realized by means of a short polling method via JSNOP.

According to a further aspect, the invention provides a server for transmitting messages in an internet transmission system, wherein the server is adapted to receive a request for transmitting a picture file from a client, to generate a picture file having a first content in response to the reception of the request, in case that no message is available for the client, and to send the picture file delayed by a time interval, or to preferably immediately send a picture file having a second content in response to the reception of the request, in case that a message is available for the client, wherein the server is further adapted to receive a request for transmitting the message from the client and to transmit the message preferably immediately after the reception of the request for transmitting the message.

The picture file is preferably a GIF, JPEG or another known picture file format.

According to a further aspect of the invention the two picture files differ in some property of the picture files, preferably the image sizes are different. Here, the picture file with the first content is a picture file with only one pixel and the picture file with the second content is a picture file with two pixels, wherein this assignment can vary and is not to be understood restrictively, so that other numbers of pixels can also be used. According to a further aspect of the invention JSONP is used for transmitting the message.

Preferably the server is characterized in that requests of the client and the transmission of the picture files are realized by means of repeated long polling on the picture files and the transmission of the message is realized by means of a short polling method via JSNOP.

According to another advantageous aspect the server is characterized in that for realizing the communication between client and server for transmitting the message the server is adapted for initially loading a communication application by the client in response to the reception of a request from the client.

BRIEF DESCRIPTION OF THE DRAWINGS

The present invention is explained in the following with regard to the figures and the accompanying description of the figures. The figures and the description of the figures are not to be understood restrictively and do not limit the subject matter of the present invention. The figures are only exemplary embodiments of the present invention, wherein further embodiments can be derived from the subject matter of the invention without leaving the scope of the present invention.

DETAILED DESCRIPTION OF THE PREFERRED EMBODIMENTS

Figure 1:
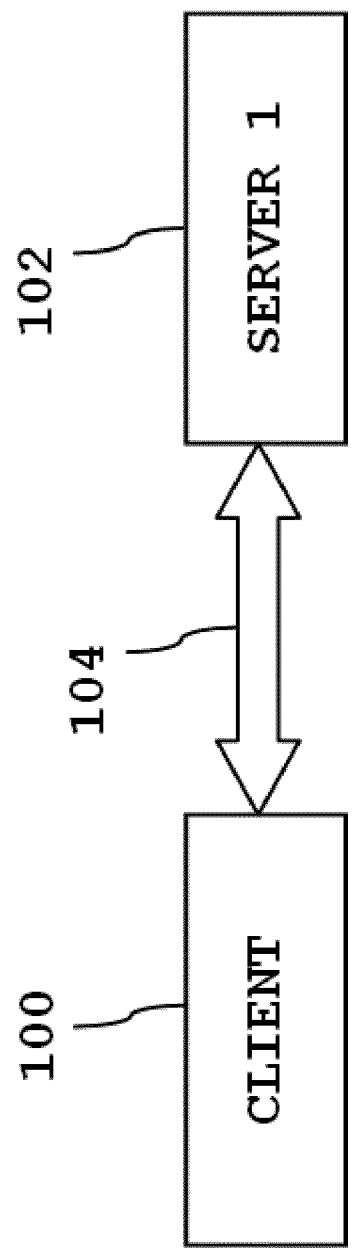
FIG. 1 shows the server and the client with an internet transmission system as connection.

FIG. 1 shows the general arrangement consisting of the server 102, client 100, and the internet transmission system 104. Here, server 102 and client 100 communicate via the internet transmission system 104.

Figure 2:
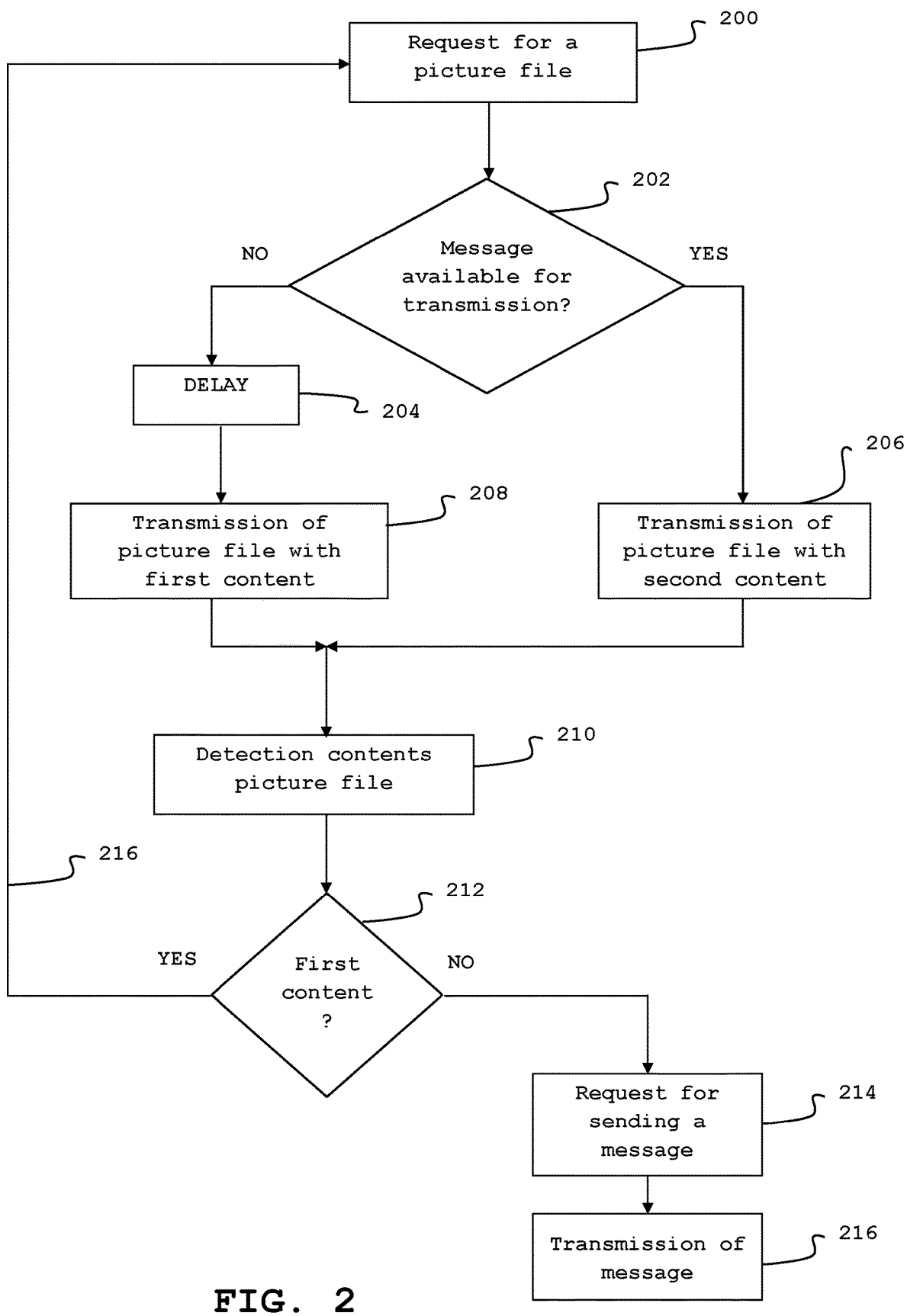
FIG. 2 shows a method according to the invention in a flow chart.

FIG. 2 shows as starting point a block 200 for sending a request from client 100 to the server 102 for transmitting a picture file. In block 202 it is checked whether a message for transmission to the client 100 is available or not. If no message for the client 100 is available the server 102 generates a picture file with a first content which is sent from server 102 to the client 100 after a delay by a time interval in block 204. After sending the picture file by the server and afterwards receiving the picture file by the client 100 the content of the picture file is verified by the client 100 in block 210 and block 212, so that again a request for sending or transmitting a picture file by the server can be started via the loop 216 at block 200, if the picture file has a first content.

Starting from block 202 and a transmission by the server of a picture file with a second content in block 206 leads to subsequent verification of a picture file with a second content at the client 100 in block 210 and block 212. After the client 100 has determined that the picture file is a picture file with the second content, the client sends in block 214 a request for transmitting a message to the server 102. Afterwards the server 102 sends the message to the client 100 according to block 216.

As can be seen from FIG. 2, in block 212 it is determined whether the picture file is a picture file with the first content. It is obviously also possible to execute the block 212 such that it is determined whether the picture file is a picture file with the second content. The exits YES and NO should then be swapped.

Figure 3:
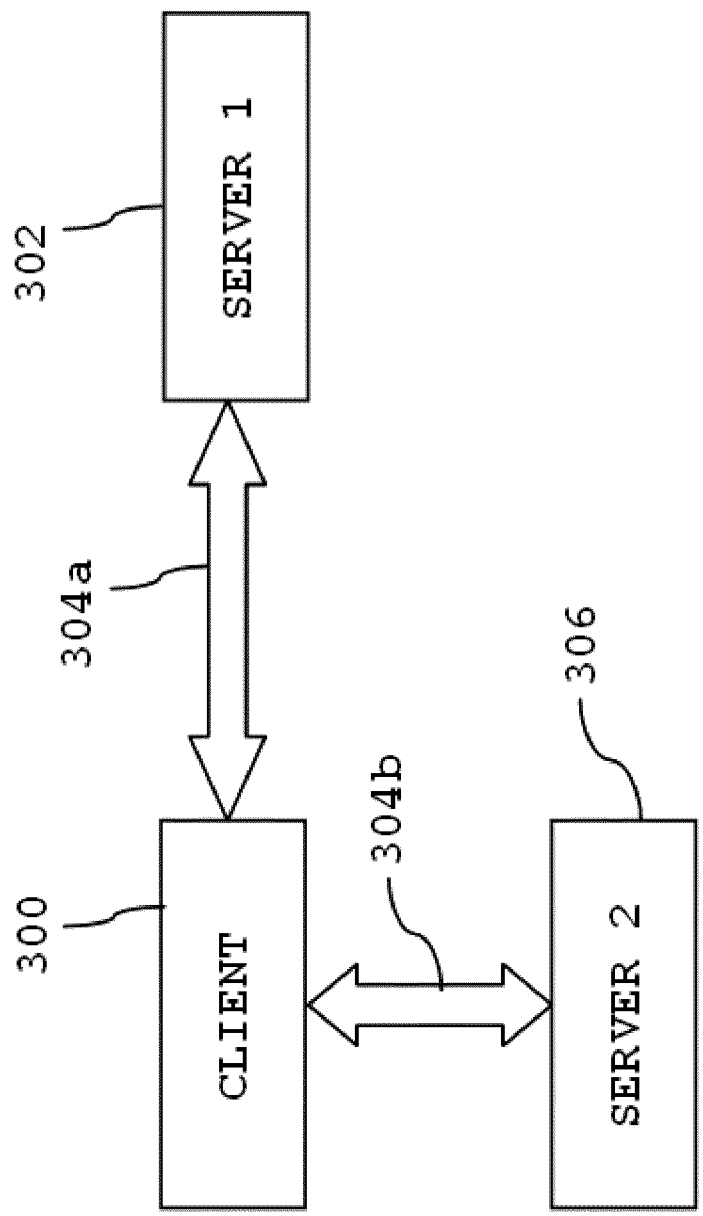
FIG. 3 shows an arrangement according to the invention for loading a communication application consisting of a first server, a second server, and client.

FIG. 3 shows the arrangement for loading a communication application as below block consisting of a first server 302, a client 300, and a second server 306. Here the first server 302 and the client 300 communicate via a first domain 304a and the second server 306 and the client 300 via a further domain 304b. The domains 304a and 304b are different from each other. FIG. 3 serves to emphasize that the client 300 receives a link from a second or further server 306 in a further application and that the mentioned link leads to the first server 302, such that the client 300 loads a communication application via the link from the first server 302.

Figure 4:
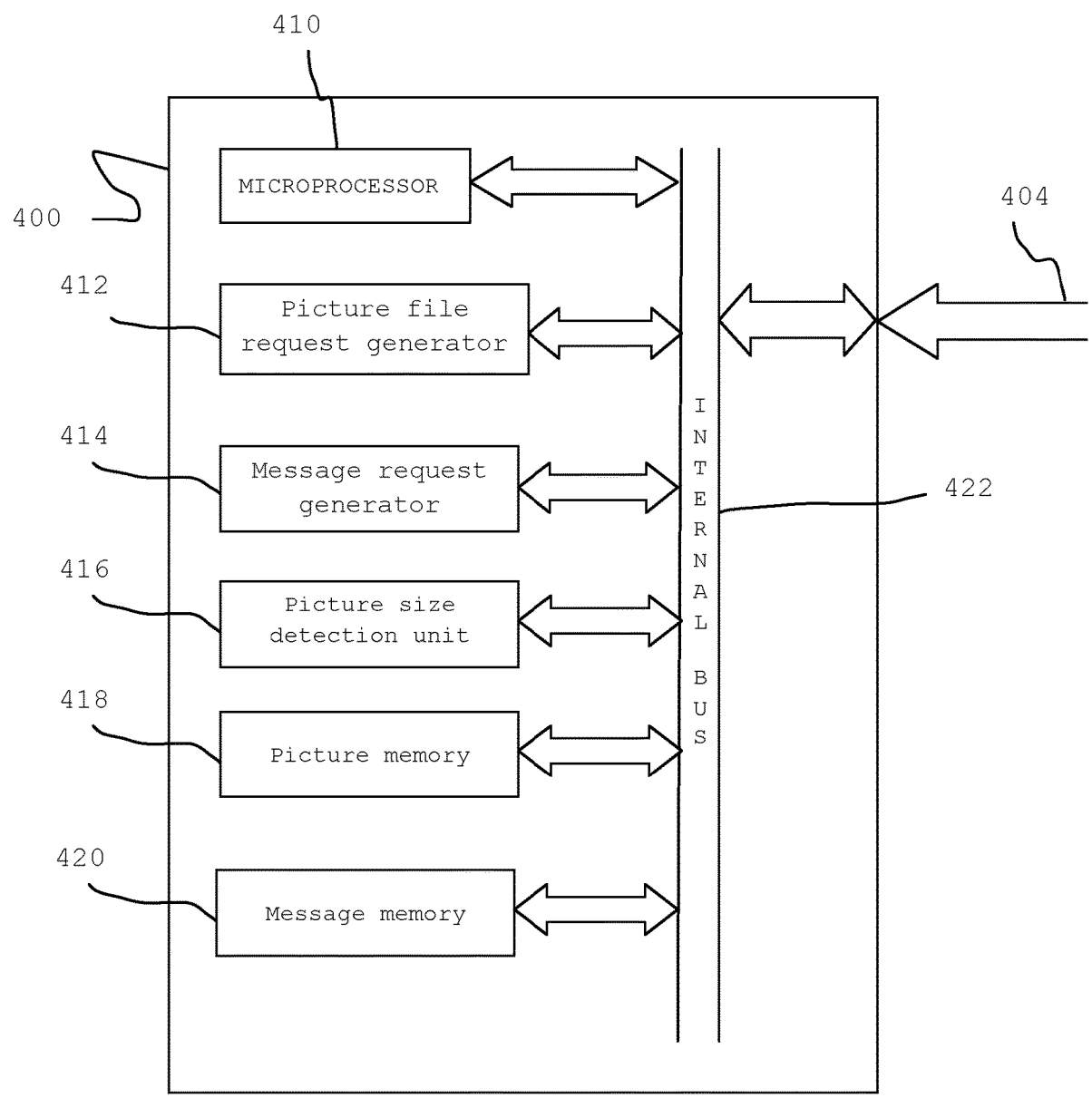
FIG. 4 shows the client according to the invention with associated components.

FIG. 4 shows the client 400 according to the invention with a processing unit 410, a picture request unit 412, a message request generator 414, a picture size detection unit 416, picture memory 418, message memory 420, and an internet interface 422. The client 400 according to the invention in FIG. 4 is adapted to communicate via an internet transmission system 404 by means of the internet interface 422 with a server. Here, the client 400 is adapted to generate a request for transmitting a picture file by means of the picture request unit 412 and to send it to the server. Furthermore, the client 400 according to the invention is adapted to store a received picture file in picture memory 418 and to determine the content of the picture file by means of the processing unit 410 and the picture size detection unit 416, in particular to detect the size of the picture file and preferably the number of pixels. After detecting the content of the picture file the client is adapted to send further requests to the server for transmitting picture files depending on the result of the detection by means of the picture request unit 412, or to generate a request for transmitting a message by means of the message request generator 414. If a message is transmitted from the server to the client 400, the client is adapted to store the received message by means of the message memory 418.

Figure 5:
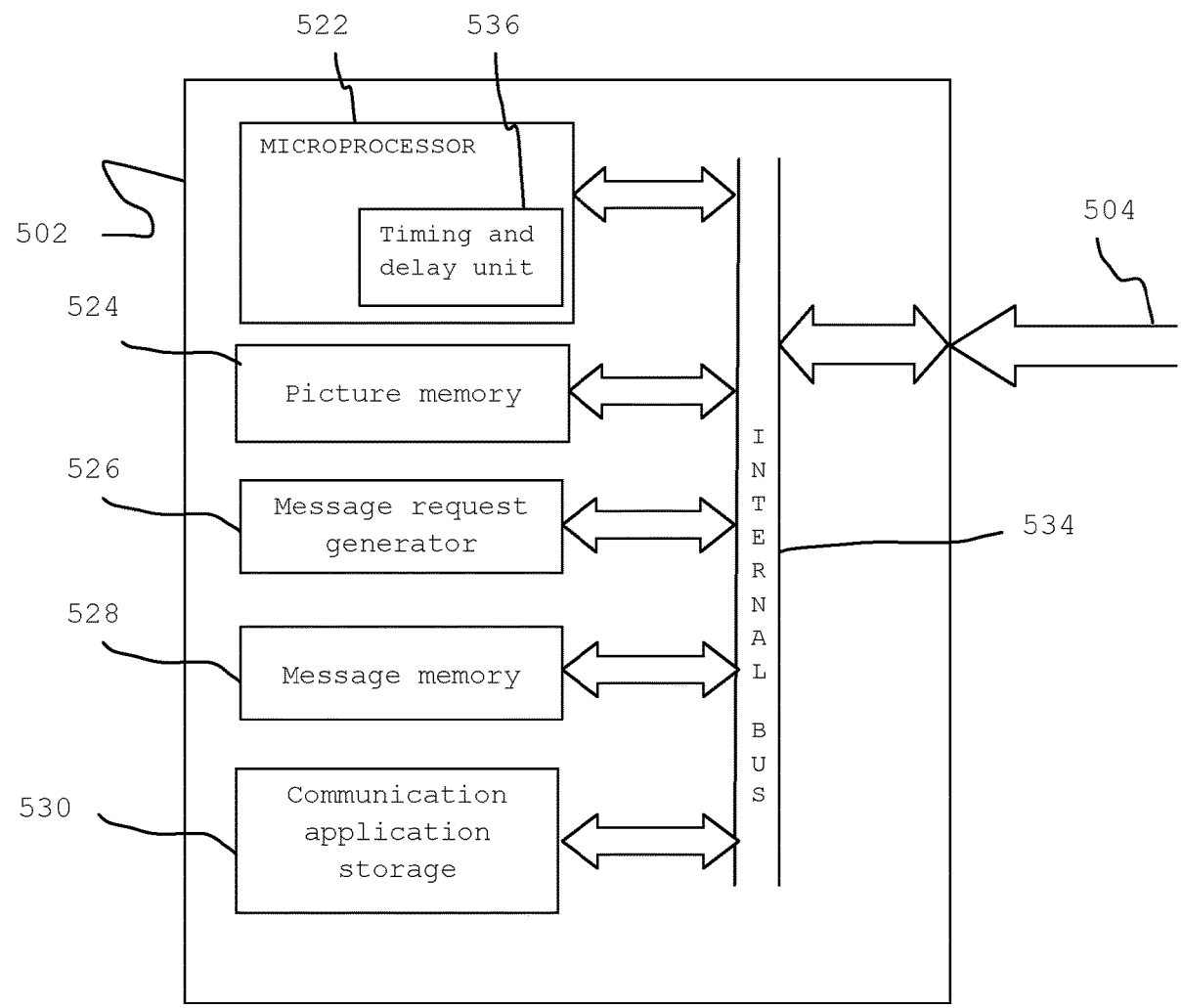
FIG. 5 shows a server according to the invention with the associated components.

FIG. 5 shows the server 502 according to the invention with a processing unit 522, a time and delay unit 536, a picture memory unit 524, a message request unit 526, a message memory 528, a communication application memory 530 and an internet interface 534 for communication via an internet transmission system 504. The server according to the invention in FIG. 5 is adapted to receive a request for transmitting a picture file from the client via the internet interface 534 and to generate a picture file as response depending on whether a message is available for the client in the message memory 528 or not or to use a picture file from the picture memory 524. Furthermore, the server 502 is adapted to delay sending of picture files by means of the time and delay unit 536, depending on whether a message is available for the client in the message memory 528 and to send corresponding picture files with a first or a second content from the image memory 524 to the client. In addition, the server is adapted to process requests to transmit messages and to send the stored messages by means of the message memory 528 via the internet interface 534 via the internet transmission system 504 to the client. Preferably, the server is adapted to store a communication application loaded previously in the communication application memory 530.

Many changes, modifications, variations and other uses and applications of the subject invention will become apparent to those skilled in the art after considering the specification and the accompanying drawings which disclose preferred embodiments thereof. All such changes, modifications, variations and other uses and applications which do not depart from the scope of the invention are deemed to be covered by this invention.

The elements and characteristics described in the various forms of preferred embodiments can be mutually combined without departing from the scope of the invention.

Further implementation details will not be described, as the man skilled in the art is able to carry out the invention starting from the teaching of the above description.

The invention claimed is:

1. A method for transmitting messages from a server to a client in an internet transmission system, said method comprising:
   a. the client sends to the server a request for transmitting a picture file;
   b. in response to a reception of the request and in response to a determination that a message is not available for the client, the server (i) generates a picture file with a first content, (ii) delays transmission of the picture file with the first content to the client for a certain time interval, and then (iii) transmits the picture file with the first content to the client;
   c. in response to a reception of the picture file with the first content by the client, the client sends a subsequent request for transmitting the picture file;
   d. the steps (b) to (c) are repeated till, upon a last request, the message subsequently becomes available for transmission to the client file;
   e. the server transmits, in response to the last request of the client, a different picture file with a second content, wherein the second content indicates that the message is available at the server;
   f. in response to a reception of the different picture file with the second content, the client sends a new request for transmitting the message; and
   g. in response to a reception of the new request for transmitting the message, the server transmits the message to the client.

2. The method as claimed in claim 1, wherein in step (e), the server transmits the different picture file with the second content immediately after the message for the client has become available in the server.

3. The method as claimed in claim 1, wherein at least one of the picture file or the different picture file is a GIF or a JPEG file.

4. The method as claimed in claim 1, wherein the picture file with the first content has a first picture size, wherein the different picture file with the second content has a second picture size, and wherein the first picture size is distinguishable relative to the second picture size.

5. The method as claimed in claim 4, wherein the picture file with the first content includes one pixel.

6. The method as claimed in claim 4, wherein the different picture file with the second content includes two pixels.

7. The method as claimed in claim 1, wherein JsonP is used for transmitting the message.

8. The method as claimed in claim 1, wherein at least the request, the subsequent request, and the last request are carried out as HTTP-Requests.

9. The method as claimed in claim 1, wherein at least the request, the subsequent request, and the last request are carried out in a communication application.

10. The method as claimed in claim 9, wherein the client receives a link in a further application from a further server, and the communication application is loaded from the server to the client via this link.

11. The method as claimed in claim 10, wherein the further application and the communication application are carried out in a browser environment in the client.

12. The method as claimed in claim 10, wherein the further application is loaded from the further server to the client.

13. The method as claimed in claim 10, wherein the server and the further server work on different domains.

14. The method as claimed in claim 1, wherein at least the request, the subsequent request, and the last request and transmission of the picture file and the different picture file are realized by means of a repeated Long-Polling on the picture, file and the different picture file, and transmitting the message is carried out by means of a Short-Polling method via JSonP.

15. A client for receiving messages in an internet transmission system, the client comprising a processor and memory, wherein the client is adapted to:
   send a request to a server for transmitting a picture file;
   receive the picture file from the server, wherein the picture file includes a first content when a message is not available for the client, and wherein the picture file includes a second content when the message is available for the client;
   determine whether the picture file includes the first content or the second content;
   if a content of the picture file includes the first content, the client is further adapted to:

send a subsequent request to the server for transmitting the picture file;

if the content of the picture file includes the second content, the client is further adapted to:

send a last request to the server for transmitting the message; and receive the message.

16. The client as claimed in claim 15, wherein the picture file is a GIF or a JPEG file.

17. The client as claimed in claim 15, wherein the client is provided with a detection unit for establishing whether the picture file includes the first content or the second content.

18. The client as claimed in claim 17, wherein the detection unit is further adapted to establish whether the picture file includes one pixel or two pixels.

19. The client as claimed in claim 15, wherein JsonP is used for transmitting the message.

20. The client as claimed in claim 15, wherein the request, the subsequent request, and the last request are carried out as HTTP-requests.

21. The client as claimed in claim 15, wherein the client is adapted to carry out the request, the subsequent request, and the last request in a communication application.

22. The client as claimed in claim 21, wherein the client is adapted to receive a link in a further application from a further server, and is adapted to store the communication application via this link from the server.

23. The client as claimed in claim 22, wherein the client is adapted to carry out the further application and the communication application in a browser environment.

24. The client as claimed in claim 22, wherein the client is adapted to receive the further application from the further server.

25. The client as claimed in claim 15, wherein the request, the subsequent request, and the last request and transmission of the picture file are realized by means of a repeated Long-Polling on the picture file, and transmitting the message is realized by means of a Short-Polling method via JSonP.

26. A server for transmitting messages in an internet transmission system, the server comprising a processor and memory, wherein the server is adapted to:

receive a request for transmitting a picture file from a client;

in response to a reception of the request, generate a picture file having a first content when a message for the client is not available, and send, after a delay, the picture file having the first content; or in response to the reception of the request, transmitting a different picture file having a second content when the message for the client is available, receive a subsequent request for transmitting the message from the client after transmitting the different picture file having the second content; and transmit the message after a reception of the subsequent request for transmitting the message.

27. The server as claimed in claim 26, wherein the server is adapted to transmit, in response to the reception of the request for transmitting the picture file, the different picture file, which includes the second content, and wherein the server transmits the different picture file immediately after the message for the client has become available on the server.

28. The server as claimed in claim 26, wherein the server is further adapted to transmit the message immediately after the reception of the subsequent request for transmitting the message.

29. The server as claimed in claim 26, wherein at least one of the picture file or the different picture file is a GIF file or a JPEG file.

30. The server as claimed in claim 26, wherein the picture file having the first content has a first size, wherein the different picture file having the second content has a second size, and wherein the first size is distinguishable relative to the second size.

31. The server as claimed in claim 30, wherein the picture file having the first content includes one pixel.

32. The server as claimed in claim 30, wherein the different picture file having the second content includes two pixels.

33. The server as claimed in claim 26, wherein JsonP is used for transmitting the message.

34. The server as claimed in claim 26, wherein the request and the subsequent request of the client and transmitting the picture file and the different picture file are carried out by means of a repeated Long-Polling on the picture file and the different picture file, and transmitting the message is realized by means of a Short-Polling method via JSonP.

35. The server as claimed in claim 26, wherein for realizing communication between client and server for transmitting the message, the server is adapted to initially loading a communication application to the client, in response to reception of a specific request thereto from the client.

* * * * *